United States Patent Office 3,743,687
Patented July 3, 1973

3,743,687
LOWER ALKYL-S-[1 - BROMOPROPYL-(2)-MERCAPTOMETHYL]-(THIONO) THIOLPHOSPHORIC OR PHOSPHONIC ACID ESTERS
Gerhard Schrader, Wuppertal-Cronenberg, and Ingeborg Hammann and Wolfgang Behrenz, Cologne, Germany, assignors to Bayer Aktiengesellschaft, Leverkusen, Germany
No Drawing. Filed July 23, 1970, Ser. No. 57,750
Claims priority, application Germany, Aug. 16, 1969,
P 19 41 705.1
Int. Cl. A01n 9/36; C07f 9/08
U.S. Cl. 260—948
4 Claims

ABSTRACT OF THE DISCLOSURE (Optionally halogen-substituted) lower alkyl-S-[1-bromopropyl - (2) - mercaptomethyl] - (thiono)thiolphosphoric or -phosphonic acid esters, e.g. O,O-dimethyl- or -diethyl - S - [1 - bromopropyl - (2) - mercaptomethyl]-thionothiolphosphoric acid ester, which possess arthropodicidal, especially acaricidal and insecticidal, properties, and process for their preparation.

---

The present invention relates to and has for its objects the provision of particular new (optionally halogen-substituted) lower alkyl-S-[1-bromopropyl-(2)-mercaptomethyl]-thiono)thiolphosphoric or -phosphonic acid esters, e.g. O,O-dimethyl- or -diethyl-S-[1-bromopropyl-(2) - mercaptomethyl] - thionothiolphosphoric acid ester, which possess arthropodicidal, especially acaricidal and insecticidal, properties, and process for their preparation, active compositions in the form of mixtures of such compounds with solid and liquid dispersible carrier vehicles, and methods for producing such compounds and for using such compounds in a new way especially for combating pests, e.g. arthropods, especially insects and acarids, with other and further objects becoming apparent from a study of the within specification and accompanying examples.

In U.S. patent specification 1,949,629, there is described the reaction of 1,2-dichloroethane with the ammonium salt of O,O-diisopropylthionothiolphosphoric acid in which O,O - diisopropyl - S - (2-chloroethyl)-thionothiolphosphoric acid ester is said to be formed in the first reaction step. The isolation or preparation in pure form of this hypothetical intermediate product is, however, not disclosed.

According to the particulars given in U.S. patent specification 2,266,514, the compound is said to be obtained by reaction of equimolar amounts of the aforesaid starting materials, but details in regard to purity and yield of the product are lacking.

Finally, from German patent specification 1,005,058, it is known that, in general, symmetric 1,2-dihaloethanes, for example dichloro- or dibromo-ethane, react with O,O-dialkylthiol or -thionothiol-phosphoric acid salts with the exchange of both halogen atoms for the thiolphosphoric acid radical. According to the particulars given in the German patent specification cited above, a selective substitution of the halogen atoms is only successful in the case of the reaction with O,O-dialkylthionothiolphosphoric acid salts when the work is carried out in aqueous solution, while the reaction with the salts of the corresponding thiolphosphoric acids leads to the desired successful result only when methylethyl ketone is used as solvent.

The present invention provides thiol- or thionothiol-S-[1 - bromopropyl - (2) - mercaptomethyl] - phosphoric or -phosphonic acid esters of the general formula:

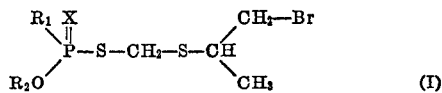

in which $R_1$ stands for an optionally halogen-substituted lower alkyl or alkoxy radical,
$R_2$ stands for an optionally halogen-substituted lower alkyl group, and
X stands for oxygen or sulphur atom.

The invention also provides a process for the production of such compound in which a thio- or thionothiolphosphoric(phosphonic) acid salt of the general formula:

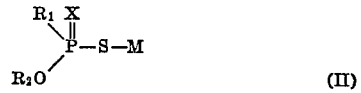

is reacted with a halomethyl-1-bromoisopropyl thioether of the general formula:

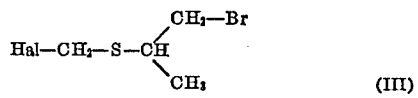

in which $R_1$, $R_2$ and X have the same meanings as above,
M denotes a monovalent metal equivalent or an ammonium group, and
Hal represents a chlorine or bromine atom.

The reaction is preferably carried out in the presence of an organic solvent.

The process of the invention makes it possible to prepare the compounds smoothly and without side reactions; the uniform course of the process could in no way be foreseen. It was surprising that, in the reaction, only one halogen atom is substituted.

The course of the process can be represented by the following reaction scheme:

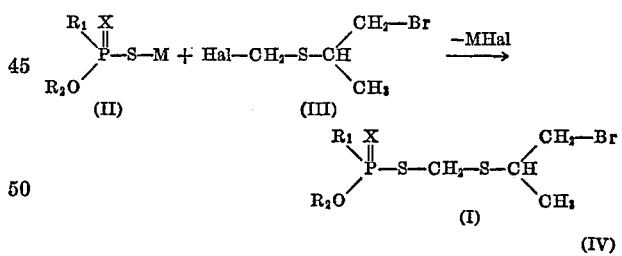

Preferably, $R_1$ stands for an optionally halogen-substituted lower alkyl or alkoxy radical with 1 to 4 carbon atoms, such as the methyl, methoxy, ethyl, ethoxy, β-chloroethoxy, β-chloroethyl, β,β,β-trichloroethoxy, n- and isopropyl, n- and isopropoxy, n-, iso- and sec.-butyl as well as n-, iso- and sec.-butoxy radical. $R_2$ denotes preferably an optionally halogen-substituted alkyl group with 1 to 4 carbon atoms, e.g. methyl, ethyl, β-chloroethyl, β,β,β-trichloroethyl, n- and isopropyl, n-, iso- and sec.-butyl, $R_1$ and $R_2$ possibly being the same or different from one another. M stands preferably for an alkali metal (particularly potassium or sodium) ion or the ammonium group and Hal preferably for chlorine.

The halomethyl-1-bromoisopropyl thioethers of the general Formula III required as starting materials are readily accessible, even on an industrial scale, for example in the following way:

Propylene sulphide is converted into the appropriate 1-bromoisopropylmercaptan with the aid of concentrated hydrobromic acid (cf. "Houben-Weyl, Die Methoden der organischen Chemie," 4th edition, vol. IX, page 160):

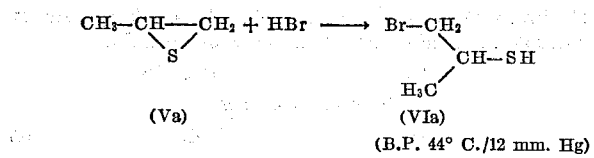

(B.P. 44° C./12 mm. Hg)

The bromoisopropylmercaptan can subsequently be reacted according to known methods by means of formaldehyde and hydrogen halide, preferably hydrogen chloride, according to Equation VII to give the desired halomethyl-1-bromoisopropyl thioether:

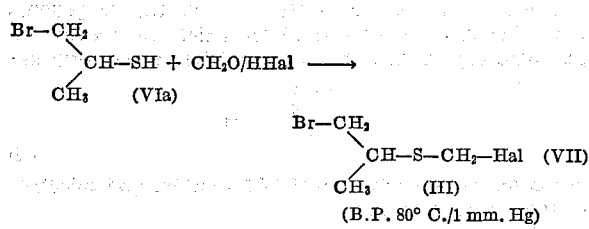

(B.P. 80° C./1 mm. Hg)

The process for the preparation of the new compounds is, as already mentioned, preferably carried out in the presence of a solvent which term includes a mere diluent. As such, practically all organic solvents inert to the reactants are suitable. These include hydrocarbons and chlorinated hydrocarbons, such as benzine, benzene, toluene, xylene and chlorobenzene; ethers, for example diethyl ether, dibutyl ether, dioxan and tetrahydrofuran; alcohols, such as methanol, ethanol, n-propanol and iso-propanol. Particularly good results have been obtained with low-boiling aliphatic ketones or nitriles, such as acetone, methylethyl ketone, methylisobutyl ketone, methylisopropyl ketone, acetonitrile and propionitrile.

The reaction may be carried out within a fairly wide temperature range. In general, the reaction is carried out at from 0 to 100° C. or the boiling point of the mixture, preferably at 10 to 20° C.

According to the reaction scheme (IV) stated above, one mole of halomethyl-1-bromoisopropyl thioether is needed per mole of thiol- or thionothiol-phosphoric (-phosphonic) acid salt. Expediently, a mixture of (thiono)thiol-phosphoric (-phosphonic) acid salt and one of the above-mentioned solvents, preferably acetonitrile, is provided, and to this mixture the halomethyl-1-bromo-isopropyl thioether is added dropwise. After completion of the addition, the reaction mixture is, in order to complete the reaction, stirred for a further 1 to 4 hours, optionally with slight heating, and it is then cooled to room temperature. Working up of the mixture takes place in customary manner by pouring out the mixture into water, taking up the separated oily reaction product in one of the above-mentioned hydrocarbons, preferably benzene, washing and drying the organic phase and evaporation of the solvent.

The new products are obtained in most cases in the form of colorless to slightly yellow-colored, water-insoluble oils, which, even under greatly reduced pressure, cannot be distilled without decomposition.

The thiol- or thionothiol-phosphoric or -phosphonic acid esters according to the invention are distinguished by outstanding insecticidal, acaricidal and, in some cases, rodenticidal, properties, with, in some cases, extremely low phytotoxicity. The products may therefore be used in crop protection and the protection of stored products, as well as in the hygiene field, for the control of noxious sucking and biting insects, Diptera and mites (Acari).

To the sucking insects contemplated herein there belong, in the main, aphids (Aphidae) such as the green peach aphid (Myzus persicae), the bean aphid (Doralis fabae), the bird cherry aphid (Rhopalosiphum padi), the pea aphid (Marcrosiphum pisi) and the potato aphid (Macrosiphum solanifolii), the currant gall aphid (Cryptomyzus korschelti), the mealy apple aphid (Sappahis mali), the mealy plum aphid (Hyalopterus arundinis) and the cherry black-fly (Myzus cerasi) in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the cotton bug (Dysdercus intermedius), the bed bug (Cimex lectularius), the assassin bug (Rhodnius prolixus) and Chagas' bug (Triatoma infestants) and, further cicadas, such as Euscelis bilobatus and Nephotettix bipunctatus; and the like.

In the case of the biting insects contemplated herein, above all there should be mentioned butterfly caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma neustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia kühniella) and greater wax moth (Galleria mellonella); and the like.

Also to be classed with the biting insects contemplated herein are beetles (Coleoptera), for example the granary weevil (Sitophilus granarius=Calandra granaria), the Colorado beetle (Leptinotarsa decemlineata), the dock beetle (Gastrophysa viridula), the mustard beetle (Phaedon cochleariae), the blossom beetle (Meligethes aeneus) the raspberry beetle (Byturus tomentosus), the bean weevil (Bruchidius=Acanthoscelides obtectus), the leather beetle (Dermestes frischi), the khapra beetle (Trogoderma granarium), the flour beetle (Tribolium castaneum), the northern corn billbug (Calandra or Sitophilus zeamais), the drugstore beetle (Stegobium paniceum), the yellow mealworm (Tenebrio molitor) and the sawtoothed grain beetle (Oryzaephilus surinamensis), and also species living in the soil, for example wireworms (Agriotes spec.) and larvae of the cockchafer (Melolontha melolontha); cockroaches, such as the German cockroach (Blattella germanica), American cockroach (Periplaneta americana) Maderia cockroach (Leucophaea or Rhyparobia madeirae), Oriental cockroach (Blatta orientalis), the giant cockroach (Blaberus giganteus) and the black giant cockroach (Blaberus fuscus) as well as Henschoutedenia flexivitta; further, Orthoptera, for example the house cricket (Acheta domesticus); termites such as the eastern subterranean termite (Recticulitermes flavipes) and Hymenoptera such as ants, for example the garden ant (Lasius niger); and the like.

The Diptera comprise essentially the flies, such as the vinegar fly (Drosophila melanogaster), the Mediterranean fruit fly (Ceratitis capitata), the house fly (Musca domestica), the little house fly (Fannia canicularis), the black blow fly (Phormia aegina) and bluebottle fly (Calliphora erythrocephala) as well as the stable fly (Stomoxys calcitrans); further, gnats, for example mosquitoes such as the yellow fever mosquito (Aedes aegypti), the northern-house mosquito (Culex pipiens) and the malaria mosquito (Anopheles stephensi); and the like.

With the mites (Acari) there are classed, in particular the spider mites (Tetranychidae) such as the two-spotted spider mite (Tetranychus telarius=Tetranychus althaeae or Tetranychus urticae) and the European red mite (Paratetranychus pilosus=Panonychus ulmi), blister mites, for example the currant blister mite (Eriophyes ribis) and tarsonemids, for example the broad mite (Hemitarsonemuslatus) and the cyclamen mite (Tarsonemus pallidus);

finally, ticks, such as the relapsing fever tick (*Ornithodorus moubata*); and the like.

When applied against hygiene pests and pests of stored products, particularly flies and mosquitoes, the novel products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.) ethers, etheralcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alimina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magesium stearate, sodium oleate, etc.): and/or dispersing agents, such as lignin, sulfite waste liquors, methyl celulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5% by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates method of selectively killing, combatting or controlling pests, e.g. arthropods, i.e. insects and acarids, and more particularly methods of combatting at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

Surprisingly, the new compounds, compared with the active compounds of analogous constitution and the same direction of activity hitherto known from the literature, are distinguished by a substantially better effectiveness, with lower toxicity to warm-blooded animals as mentioned above. They therefore represent a genuine enrichment of the art. This unexpected superiority, as well as the outstanding activity of the compounds according to the invention, is illustrated, without being limited by the following examples.

EXAMPLE 1

Plutella test

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 1.

TABLE 1.—PLUTELLA TEST

| Active compound (constitution) | Concentration of active compound in percent | Degree of destruction in percent after 3 days |
|---|---|---|
| (A) $(CH_3O)_2\overset{O}{\overset{\|}{P}}-S-CH_2-CH_2-S\,C_2H_5$ (known) | 0.1<br>0.02 | 100<br>0 |
| (1) $(CH_3O)_2P-S-CH_2-S-\underset{\underset{CH_3}{\|}}{CH}-CH_2-Br$ | 0.1<br>0.02 | 100<br>100 |
| (2) $(C_2H_5O)_2\overset{S}{\overset{\|}{P}}-S-CH_2-S-\underset{\underset{CH_3}{\|}}{CH}-CH_2-Br$ | 0.1<br>0.02 | 100<br>100 |

EXAMPLE 2

Ceratitis test

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

2 cc. of the preparations of the active compound are pipetted on to a filter paper disc of about 10 cc. diameter. This is placed on a glass in which there are about 30 fruit flies (*Ceratitis capitata*) and covered with a glass plate.

After the specified periods of time, the destruction is determined as a percentage. 100% means that all the flies were killed; 0% means that none of the flies were killed.

The active compounds, the concentrations of the active compounds the evaluation times and the results can be seen from Table 2.

TABLE 2.—CERATITIS TEST

| Active compound (constitution) | Concentration of active compound in percent | Degree of destruction in percent after 3 days |
|---|---|---|
| (A) $(CH_3O)_2\overset{O}{\overset{\|}{P}}-S-CH_2-CH_2-S\,C_2H_5$ (known) | 0.1<br>0.02<br>0.004 | 100<br>89<br>0 |
| (1) $(CH_3O)_2\overset{S}{\overset{\|}{P}}-S-CH_2-S-\underset{\underset{CH_3}{\|}}{CH}-CH_2-Br$ | 0.1<br>0.02<br>0.004 | 100<br>100<br>100 |
| (2) $(C_2H_5O)_2\overset{S}{\overset{\|}{P}}-S-CH_2-S-\underset{\underset{CH_3}{\|}}{CH}-CH_2-Br$ | 0.1<br>0.02<br>0.004 | 100<br>100<br>100 |

EXAMPLE 3

Tetranychus test

Solvent: 3 parts by weight acetone.
Emulsifier: 1 part by weight alkylaryl polyglycol ether.
To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from Table 3.

TABLE 3.—TETRANYCHUS TEST

| Active compound (constitution) | Concentration of active compound in percent | Degree of destruction in percent after 3 days |
|---|---|---|
| (A) $(CH_3O)_2\overset{O}{\overset{\|}{P}}-S-CH_2-HC_2-S\,C_2H_5$ (known) | 0.1<br>0.02 | 98<br>0 |
| (2) $(C_2H_5O)_2\overset{S}{\overset{\|}{P}}-S-CH_2-S-\underset{\underset{CH_3}{\|}}{CH}-CH_2-Br$ | 0.1<br>0.02 | 100<br>100 |

EXAMPLE 4

LD$_{100}$ test

Test insects: *Leucophaea madeirae* (Madeira cockroach).

Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

tration of the solution of active compound used. About 25 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from Table 5.

TABLE 5.— $LD_{100}$ TEST/*SITOPHILUS GRANARIUS*

| Active compound (constitution) | | Concentration of active compound of the solution in percent | Degree of destruction in percent |
|---|---|---|---|
| (A) | $(CH_3O)_2\overset{O}{\underset{\|}{P}}-S-CH_2-CH_2-SC_2H_5$ (known) | 0.2<br>0.02 | 100<br>70 |
| (1) | $(CH_3O)_2\overset{S}{\underset{\|}{P}}-S-CH_2-S-\underset{\underset{CH_3}{\|}}{CH}-CH_2Br$ | 0.2<br>0.02<br>0.002 | 100<br>100<br>100 |
| (2) | $(C_2H_5O)_2\overset{S}{\underset{\|}{P}}-S-CH_2-S-\underset{\underset{CH_3}{\|}}{CH}-CH_2-Br$ | 0.2<br>0.02<br>0.002 | 100<br>100<br>100 |

The condition of the test insects is observed 3 days after the commencement of the experiments. The destruction is determined as a percentage.

The active compounds, the concentrations of the active compounds, the test insects and the results can be seen from Table 4.

EXAMPLE 6

Mosquito larvae test

Test insects: *Aedes aegypti* (5th larval stage).
Solvent: 99 parts by weight acetone.
Emulsifier: 1 part by weight benzylhydroxydiphenyl polyglycol ether.

TABLE 4.— $LD_{100}$ TEST/*LEUCOPHAEA MADEIRAE*

| Active compound (constitution) | | Concentration of active compound of the solution in percent | Degree of destruction in percent |
|---|---|---|---|
| (A) | $(CH_3O)_2\overset{O}{\underset{\|}{P}}-S-CH_2-CH_2-SC_2H_5$ (known) | 0.2 | 0 |
| (1) | $(CH_3O)_2\overset{S}{\underset{\|}{P}}-S-CH_2-S-\underset{\underset{CH_3}{\|}}{CH}-CH_2-Br$ | 0.2<br>0.02 | 100<br>60 |
| (2) | $(C_2H_5O)_2\overset{S}{\underset{\|}{P}}-S-CH_2-S-\underset{\underset{CH_3}{\|}}{CH}-CH_2-Br$ | 0.2<br>0.02 | 100<br>100 |

EXAMPLE 5

$LD_{100}$ test

Test insects: *Sitophilus granarius* (granary weevils).
Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concen- To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The active compounds, the concentrations of the active compounds, the test insects and the results can be seen from Table 6.

TABLE 6.—MOSQUITO LARVAE TEST

| Active compound (constitution) | | Concentration of active compound of the solution in percent | Degree of destruction in percent |
|---|---|---|---|
| (A) | $(CH_3O)_2\overset{O}{\underset{\|}{P}}-S-CH_2-CH_2-SC_2H_5$ (known) | 10<br>1 | 100<br>0 |
| (1) | $(CH_3O)_2\overset{S}{\underset{\|}{P}}-S-CH_2-S-\underset{\underset{CH_3}{\|}}{CH}-CH_2Br$ | 10<br>1 | 100<br>100 |
| (2) | $(C_2H_5O)_2\overset{S}{\underset{\|}{P}}-S-CH_2-S-\underset{\underset{CH_3}{\|}}{CH}-CH_2-Br$ | 10<br>1 | 100<br>100 |

The following further examples are set forth to illustrate, without limitation, the process for producing the active compounds according to the present invention.

EXAMPLE 7

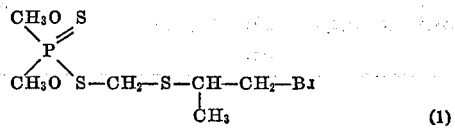

0.4 molar mixture:

78 g. potassium O,O-dimethylthionothiolphosphate are dissolved in 300 ml. acetonitrile. To this solution there are added at 0 to 10° C., with vigorous stirring, 82 g. chloromethyl-1-bromoisopropyl thioether; the mixture is subsequently stirred for a further 2 hours at 25 to 40° C. and the reaction mixture is then poured into 300 ml. of ice water. The separated oil is taken up in 200 ml. benzene, the benzene solution is separated and dried over sodium sulfate. After the solvent has been distilled off, there remain behind 99 g. (76% of the theory) of O,O-dimethyl - S - [1-bromopropyl - (2) - mercaptomethyl]-thionothiolphosphoric acid ester as a colorless, water-insoluble oil with the refractive index $n_D^{25}=1.5460$.

Calcalulated for a molecular weight of 325 (percent): P, 9.6; S, 29.8; Br 24.6. Found (percent): P, 10.0; S, 30.0; Br, 24.9.

EXAMPLE 8

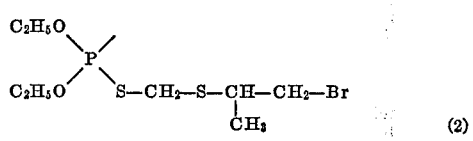

0.4-molar mixture:

To a solution of 90 g. potassium O,O-diethylthionothiolphosphate in 300 ml. acetonitrile there are added at 0 to 10° C., with stirring, 82 g. chloromethyl-1-bromoisopropyl thioether, the mixture is stirred for a further 2 hours at 30 to 40° C. and the reaction mixture is then poured into 300 ml. of ice water. The separated oil is taken up in 200 ml. benzene, and the benzene solution is separated and dried over sodium sulfate. After the solvent has been distilled off, 119 g. (84% of the theory) of O,O-diethyl-S-[1-bromopropyl - (2) - mercaptomethyl]-thionothiolphosphoric acid ester are obtained as a slightly yellow, water-insoluble oil with the refractive index $n_D^{25}=1.5421$.

Calculated for a molecular weight of 353 (percent): P, 8.8; S, 27.2; Br, 22.6. Found (percent): P, 9.0; S, 27.4; Br, 22.8.

The chloromethyl-1-bromoisopropyl thioether used as a starting material in Examples 7 and 8 can be prepared as follows:

EXAMPLE 9

(A) 1-bromoisopropylmercaptan 2-molar mixture:

To 500 ml. of 40%-strength hydrobromic acid there are added dropwise, at 20 to 25° C., with stirring, 148 g. propylene sulfide; the mixture is subsequently stirred for a further hour and the reaction mixture is then taken up in 300 ml. methylene chloride. The methylene chloride solution is separated, washed with water, and the organic phase, after drying over sodium sulfate, is fractionally distilled. 193 g. 1-bromoisopropylmercaptan of B.P. 44° C./12 mm. Hg are obtained.

(B) Chloromethyl-1-bromoisopropyl thioether 1-molar mixture:

38 g. paraformaldehyde are suspended in 250 ml. benzene, 500 ml. of concentrated hydrochloric acid are added to this suspension; after stirring for 10 minutes at room temperature, 155 g. 1-bromoisopropylmercaptan are added dropwise at 40° C. to the mixture, the latter is stirred for a further 2 hours at 50° C. and the benzene solution is then separated. The organic phase is washed with water, dried over sodium sulfate and fractionally distilled. 159 g. (78% of the theory) of chloromethyl-1-bromoisopropyl thioether of B.P. 80° C./1 mm. Hg are obtained.

It will be realized that all of the foregoing compounds contemplated by the present invention possess the desired selective pesticidal, especially arthropodicidal, i.e. insecticidal or acaricidal, properties for combating insects and acarids, and that such compounds have a low phytotoxicity and a correspondingly low mammalian toxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Thiol- or thionothiol- S-[1-bromopropyl-(2)-mercaptomethyl]-phosphoric or -phosphonic acid esters of the general formula:

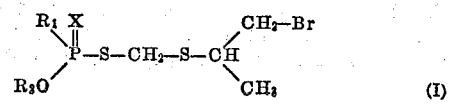

in which
R₁ stands for an optionally chlorine-substituted lower alkyl or alkoxy radical,
R₂ stands for an optionally chlorine-substituted lower alkyl group, and
X stands for oxygen or sulphur atom.

2. Compounds according to claim 1 in which $R_1$ is an optionally chlorine-substituted alkyl or alkoxy radical with 1 to 4 carbon atoms, and $R_2$ is an optionally chlorine-substituted alkyl radical with 1 to 4 carbon atoms.

3. Compound according to claim 1 wherein such compound is O,O-dimethyl-S-[1-bromopropyl-(2)-mercaptomethyl]-thionothiolphosphoric acid ester of the formula

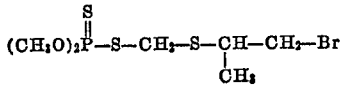 (1)

4. Compound according to claim 1 wherein such compound is O,O-diethyl - S - [1-bromopropyl-(2)-mercaptomethyl]-thionothiolphosphoric acid ester of the formula

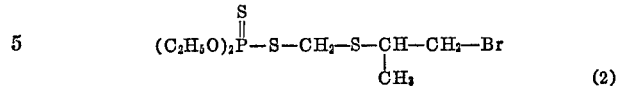 (2)

References Cited

UNITED STATES PATENTS 3,277,215  10/1966  Schrader _____ 260—948

LEWIS GOTTS, Primary Examiner

R. L. RAYMOND, Assistant Examiner

U.S. Cl. X.R.

260—609 R, 979; 424—216

UNITED STATES PATENT OFFICE
CERTIFICATE OF CORRECTION

Patent No. 3,743,687　　　　　　Dated　July 3, 1973

Inventor(s)　Gerhard Schrader et al

It is certified that error appears in the above-identified patent and that said Letters Patent are hereby corrected as shown below:

Col. 7, Table 1, Compound (1), cancel "$(CH_3O)_2P-S-CH_2-S-CH-CH_2-Br$"
$CH_3$ and substitute

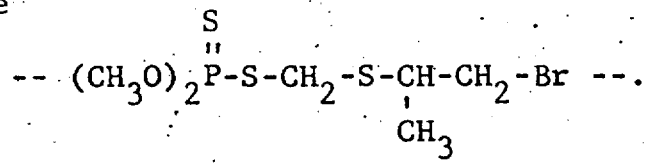

Col. 7, Table 2, under heading "Degree of Destruction in % after 24 hours", Compound (A), change "89" to --80--.

Col. 11, Table 6, Compound (1) cancel "$(CH_3O)_2P-S-CH_2-S-CH-CH_2Br$"
$CH_3$ and substitute

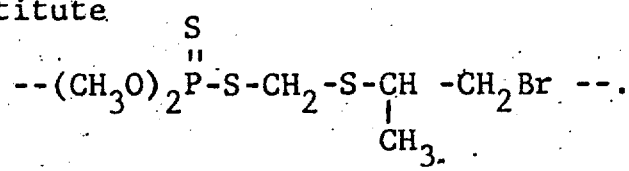

Col. 11, Table 6, Compound (2) cancel "$(C_2H_5O)_2P-S-CH_2-S-CH-CH_2-Br$"
$CH_3$ and substitute

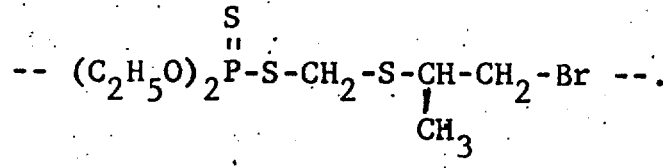

UNITED STATES PATENT OFFICE
CERTIFICATE OF CORRECTION

Patent No. 3,743,687  Dated July 3, 1973

Inventor(s) Gerhard Schrader et al  Page 2

It is certified that error appears in the above-identified patent and that said Letters Patent are hereby corrected as shown below:

Col.11, line 28, in the formula, cancel "B$^r$" and substitute --Br

Col. 11, Example 8, cancel the formula and substitute therefor

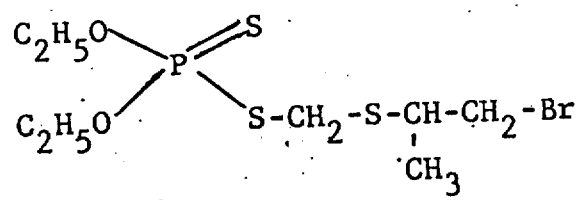

Column 7, Table 2, Ceratitis Test, in the heading, "after 3 day should read -- after 24 hours --.

Signed and sealed this 5th day of February 1974.

(SEAL)
Attest:

EDWARD M. FLETCHER, JR.
Attesting Officer

RENE D. TEGTMEYER
Acting Commissioner of Pate